United States Patent
Beaurepaire et al.

(10) Patent No.: US 9,558,716 B2
(45) Date of Patent: Jan. 31, 2017

(54) METHOD AND APPARATUS FOR CONTEXTUAL QUERY BASED ON VISUAL ELEMENTS AND USER INPUT IN AUGMENTED REALITY AT A DEVICE

(71) Applicant: HERE GLOBAL B.V., Veldhoven (NL)

(72) Inventors: Jerome Beaurepaire, Berlin (DE); Andre Fialho, Berlin (DE); Daniel Kraus, Berlin (DE)

(73) Assignee: HERE Global B.V., Veldhoven (NL)

( * ) Notice: Subject to any disclaimer, the term of this patent is extended or adjusted under 35 U.S.C. 154(b) by 218 days.

(21) Appl. No.: 14/270,203

(22) Filed: May 5, 2014

(65) Prior Publication Data

US 2015/0317836 A1 Nov. 5, 2015

(51) Int. Cl.
| | |
|---|---|
| G09G 5/00 | (2006.01) |
| G09G 5/14 | (2006.01) |
| G06T 19/00 | (2011.01) |
| G06F 3/0481 | (2013.01) |
| G06F 3/00 | (2006.01) |
| G06F 3/0484 | (2013.01) |
| G09G 5/02 | (2006.01) |

(Continued)

(52) U.S. Cl.
CPC .............. G09G 5/14 (2013.01); G06F 3/005 (2013.01); G06F 3/013 (2013.01); G06F 3/04815 (2013.01); G06F 3/04842 (2013.01); G06F 3/04845 (2013.01); G06F 3/04883 (2013.01); G06T 19/006 (2013.01); G09G 5/026 (2013.01); *G06F 2203/04802* (2013.01); *G09G 2340/12* (2013.01); *G09G 2354/00* (2013.01); *G09G 2370/10* (2013.01)

(58) Field of Classification Search
None
See application file for complete search history.

(56) References Cited

U.S. PATENT DOCUMENTS

| | | | |
|---|---|---|---|
| 8,203,605 B1 * | 6/2012 | Starner | G06T 7/2006 348/115 |
| 2006/0253491 A1 * | 11/2006 | Gokturk | G06F 17/30256 |

(Continued)

FOREIGN PATENT DOCUMENTS

WO     2014000184 A1     1/2014

OTHER PUBLICATIONS

Google Inc, "Google Gesture Search", Android Application on Google Play, accessed on Dec. 13, 2013, retrieved from https://play.google.com/store/apps/details?id=com.google.android.apps.gesturesearch, Jun. 21, 2013, 2 pages.

(Continued)

*Primary Examiner* — David H Chu
(74) *Attorney, Agent, or Firm* — Ditthavong & Steiner, P.C.

(57) ABSTRACT

An approach is provided for enabling a contextual query based on visual elements and user input in augmented reality at a device. The approach includes a method for receiving at least one input specifying content information, wherein the input is received via at least one user interface presenting image data. The method further includes processing and/or facilitating a processing of the image data to cause, at least in part, an identification of one or more visual elements. The method also includes causing, at least in part, a construction of at least one query based, at least in part, on the content information and the one or more visual elements.

20 Claims, 14 Drawing Sheets

(51) Int. Cl.
  *G06F 3/01*     (2006.01)
  *G06F 3/0488*   (2013.01)

(56) References Cited

U.S. PATENT DOCUMENTS

| | | | |
|---|---|---|---|
| 2010/0262905 A1 | 10/2010 | Li | |
| 2012/0088543 A1* | 4/2012 | Lindner | G06F 17/289 455/556.1 |
| 2013/0073583 A1 | 3/2013 | Licata et al. | |
| 2013/0076615 A1 | 3/2013 | Iao | |
| 2013/0113943 A1* | 5/2013 | Wormald | G06F 17/30253 348/207.1 |
| 2013/0278631 A1* | 10/2013 | Border | G02B 27/017 345/633 |
| 2013/0293580 A1* | 11/2013 | Spivack | G06Q 30/0643 345/633 |
| 2013/0335573 A1* | 12/2013 | Forutanpour | G06F 3/011 348/158 |
| 2014/0139551 A1* | 5/2014 | McCulloch | G09G 5/377 345/633 |
| 2015/0043814 A1* | 2/2015 | Gu | G06K 9/00671 382/165 |
| 2015/0193098 A1* | 7/2015 | Kauffmann | G06F 3/0484 715/771 |

OTHER PUBLICATIONS

Youtube, "Gesture Controlled Google Map/Street View Navigation.flv", Video, accessed on Aug. 8, 2014, retrieved from http://www.youtube.com/watch?v=to7N7Ii4PrI, Nov. 26, 2012, video run time 1 min 28 secs.

Ajanki et al., "An Augmented Reality Interface to Contextual Information", to be published in Virtual Reality, Jun. 2011, 15 pages.

\* cited by examiner

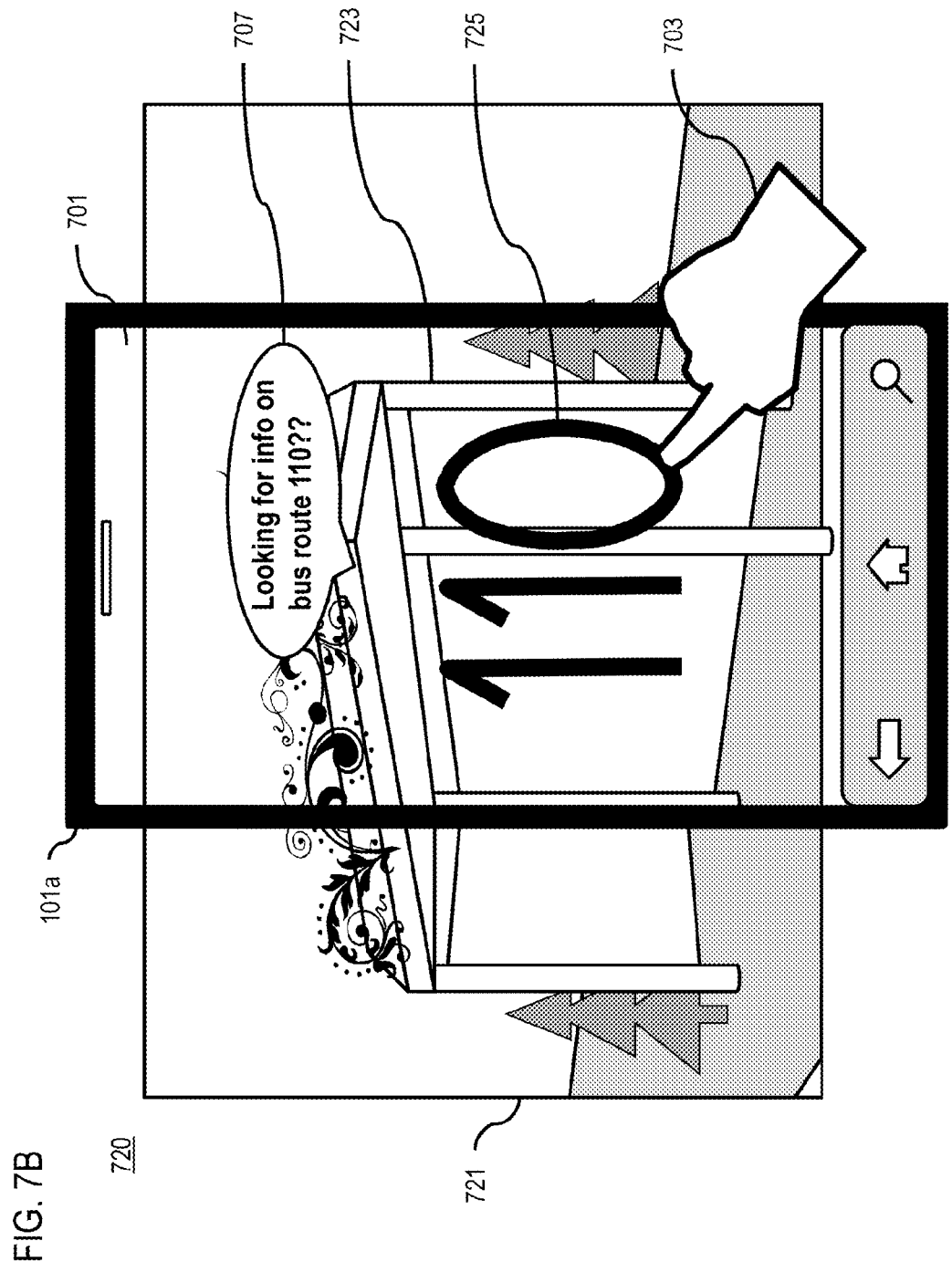

METHOD AND APPARATUS FOR CONTEXTUAL QUERY BASED ON VISUAL ELEMENTS AND USER INPUT IN AUGMENTED REALITY AT A DEVICE

BACKGROUND

Service providers (e.g., wireless, cellular, etc.) and device manufacturers are continually challenged to deliver value and convenience to consumers by, for example, providing compelling network services. One area of rapid development has been in providing various services, contents, information, etc. to users of devices in various settings. For instance, a user may use a device (e.g., a mobile phone) to search for information on a particular point of interest (POI) (e.g., a hotel), an object (e.g., a book), a service (e.g., taxi, bus, train, etc.), or the like. Additionally, as some user devices and applications may support augmented reality (AR) or virtual reality (VR) functionalities, a user may utilize those functionalities to interface with the user devices for requesting or receiving the services or contents. In one example, a user may request for navigation information from his current location to a certain POI (e.g., a restaurant), where the direction may be requested and presented via an AR map application at a user device (e.g., a navigation device in an automobile.) However, for initiating or continuing a service, a traditional interface to a user device may be cumbersome, time consuming, or not feasible at all times as a user interfacing with the device may be multitasking (e.g., driving, on a conference call, etc.) For instance, a user driving a car may not be able to continue to interface with and enter detailed information into a map application on a navigation device. In another instance, a user may wish to utilize contents at the device and provide minimal user input for initiating or continuing a service at the user device based, at least in part, on the contents and the user input. Therefore, service providers and device manufactures face significant technical challenges in enabling users to efficiently interface with a user device for requesting and receiving services and contents.

SOME EXAMPLE EMBODIMENTS

Therefore, there is a need for enabling a contextual query based on visual elements and user input in augmented reality at a device.

According to one embodiment, a method comprises receiving at least one input specifying content information, wherein the input is received via at least one user interface presenting image data. The method further comprises processing and/or facilitating a processing of the image data to cause, at least in part, an identification of one or more visual elements. The method also comprises causing, at least in part, a construction of at least one query based, at least in part, on the content information and the one or more visual elements.

According to another embodiment, an apparatus comprises at least one processor, and at least one memory including computer program code, the at least one memory and the computer program code configured, with the at least one processor, to cause, at least in part, the apparatus to receive at least one input specifying content information, wherein the input is received via at least one user interface presenting image data. The apparatus is also caused to process and/or facilitate a processing of the image data to cause, at least in part, an identification of one or more visual elements. The apparatus is further caused to cause, at least in part, a construction of at least one query based, at least in part, on the content information and the one or more visual elements.

According to another embodiment, a computer-readable storage medium carries one or more sequences of one or more instructions which, when executed by one or more processors, cause, at least in part, an apparatus to receive at least one input specifying content information, wherein the input is received via at least one user interface presenting image data. The apparatus is also caused to process and/or facilitate a processing of the image data to cause, at least in part, an identification of one or more visual elements. The apparatus is further caused to cause, at least in part, a construction of at least one query based, at least in part, on the content information and the one or more visual elements.

According to another embodiment, an apparatus comprises means for receiving at least one input specifying content information, wherein the input is received via at least one user interface presenting image data. The apparatus further comprises means for processing and/or facilitating a processing of the image data to cause, at least in part, an identification of one or more visual elements. The apparatus also comprises means for causing, at least in part, a construction of at least one query based, at least in part, on the content information and the one or more visual elements.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface (UI) element and/or (2) at least one device UI functionality, the (1) at least one device UI element and/or (2) at least one device UI functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device UI element and/or (2) at least one device UI functionality, the (1) at least one device UI element and/or (2) at least one device UI functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A through 7E illustrate example user interface diagrams utilized in the processes of the FIGS. 4 through 6, according to various embodiments;

DESCRIPTION OF SOME EMBODIMENTS

Examples of a method, apparatus, and computer program for enabling a contextual query based on visual elements and user input in augmented reality at a device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
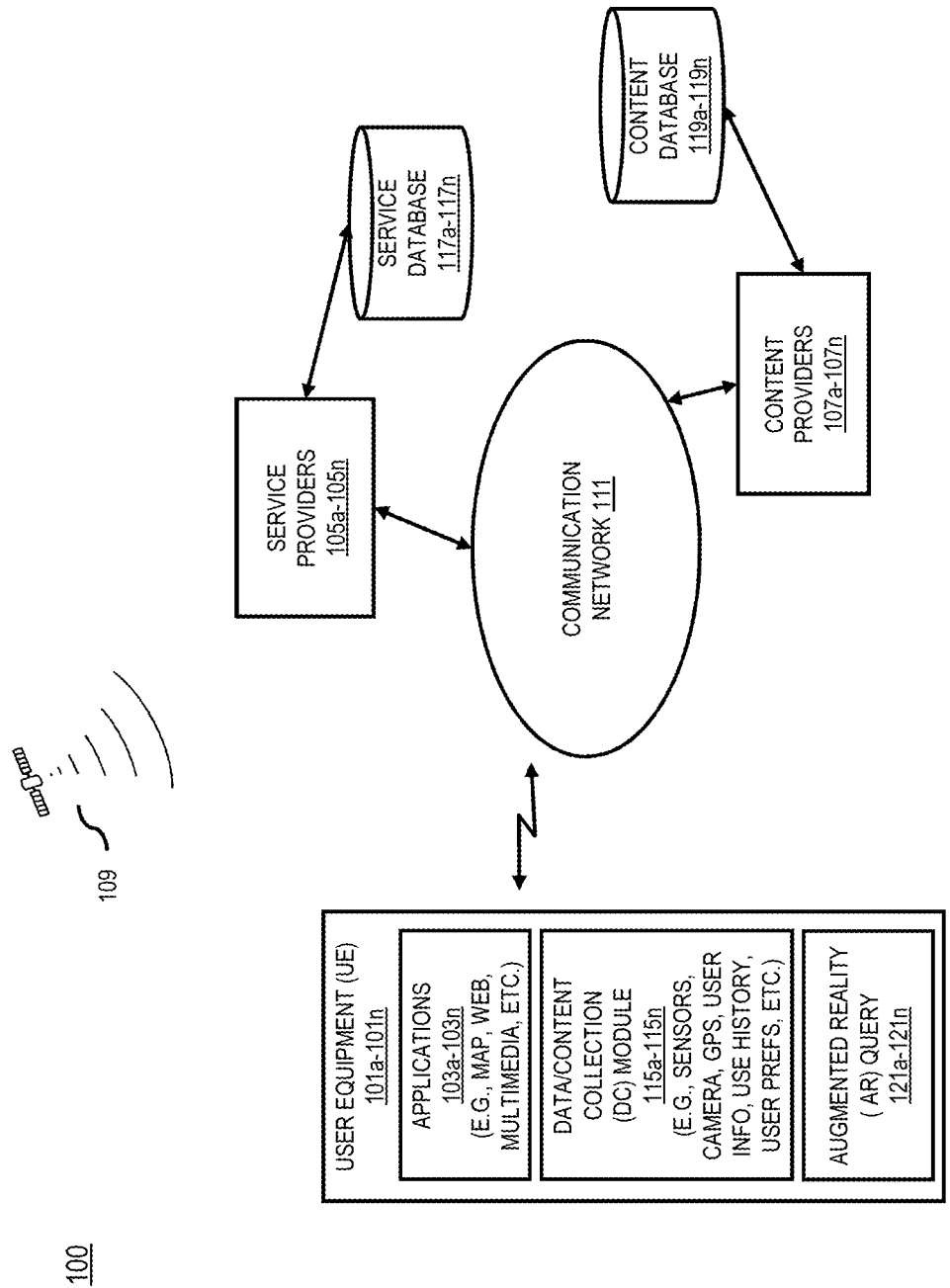
FIG. 1 is a diagram of a system for enabling a contextual query based on visual elements and user input in augmented reality at a device, according to an embodiment.

FIG. 1 is a diagram of a system capable of contextual query based on visual elements and user input in augmented reality at a device, according to an embodiment. With the proliferation of user devices and advancement of technologies thereon, users may utilize various interface options to interface with the user devices for performing various tasks. For example, a user may access a navigation application at a user device for requesting and receiving navigation information to a certain POI (e.g., a shopping mall), wherein the user may input some information about the POI. Additionally, a user may request for search information, from a service provider, about a certain object (e.g., a book, a car, a computer, etc.) where the user's request may include some information about the object so that the service provider may conduct a search and provide the requested search information. For example, while a user is driving on a street, a navigation application at a user device may present the current location of the user. Further, as the user may wish to find a particular POI (e.g., a certain building) on that street, he may interact with the navigation application/device to input information (e.g., building number/name, etc.) about the POI. In another example, a user may wish to find scheduling information about and request for one or more services (e.g., taxi, bus, train, etc.) of interest. However, as noted, a user may be unable to continuously or subsequently interact with the user device for providing details about his requested information. Additionally, a user may wish to utilize content (e.g., images) and information (e.g., location information) already available at the user device as the basis of a query for services or contents of interest. Therefore, there is a need for a contextual query based on visual elements and user input in augmented reality at a device.

To address, at least these problems, a system 100 of FIG. 1 introduces the capability of contextual query based on visual elements and user input in augmented reality at a device. Generally, a user may utilize a user device to initiate or continue with a search request for information associated with a POI, an object, a topic, a person, or the like. However, with technological advancements available in user devices, applications, service providers, databases, network capabilities, and the like, queries may be determined and processed based on contextual information determined or provided by a user device, wherein the user interface may be in AR or VR. In AR, a UI at a user device can present a digitally enhanced view of a user's environment where the user may experience a rich and realistic interaction with various content items associated with the user or the user device. For instance, a UI utilizing AR and various sensors on a smart mobile device can process additional information or content (e.g., audio, video, images, etc.) to overlay on top of contents in a user environment. In one example, in a query om AR, a user may initiate a query based on content and user input, at a device, as well as any associated contextual information, which can be determined or inferred by processing the content and the user input. In one scenario, a user may utilize a visual image of an object, POI, etc., which may have been captured via the device, stored at the device, visible at the device, or the like, for requesting search information about the object or POI present in the visual image. Further, the user may input additional information, at the device, for continuing or refining the search request. For example, a user device may be displaying on a map application the current location of the user (e.g., while driving, walking, etc.) and if the user inputs a building number/name, it could be inferred the user is requesting for the map application to show/highlight location of the building on the map. In another example, a user may select an object from a plurality of objects visible in an image and with some additional input, the user may initiate a query on the selected object. In various scenarios, one or more applications at a user device capable of AR or VR may determine and process objects, POIs, or user input for initiating or continuing with a query. Further, contextual information about the object/

POI and the user input for a query may be determined by the user device and/or a service/content provider.

In one embodiment, the system 100 receives at least one input specifying content information, wherein the input is received via at least one user interface presenting image data. In one embodiment, the at least one user interface includes, at least in part, at least one AR user interface. In one embodiment, one or more applications 103 or an AR query application 121 may receive a user input or content information from one or more sensors or a UI element at a UE 101. In one embodiment, the content information is determined from a user tactile input, a user audio input, a user gaze information, a user activity, one or more applications of at least one device, or a combination thereof. For instance, the content information may be determined from a user's interaction with a touch sensitive display, a keyboard, a microphone, an optical sensor, or a magnetometer. For example, a user may sketch/write onto a touch screen on a mobile device. Also, the content information may be determined from data associated with one or more applications 103, e.g., a calendar application, a social networking application, or the like. In one embodiment, the system 100 determines the image data via one or more sensors at the at least one device, one or more applications at the at least one device, from a storage associated with the at least one device, or a combination thereof. In one embodiment, a user may utilize a camera sensor and a multimedia application at a UE 101 to capture the image data, which may be an image of an object, a POI, or the like, which may be presented via a UI display at the UE 101. In one embodiment, the image data may include an image that is retrieved from a local or a remote storage device. In one embodiment, an image may be temporarily captured via a view finder of a camera sensor and then presented at the UI display of the UE 101, wherein a user may interact with the image. For example, a user may enable a camera sensor at a UE 101 and then point the UE 101 at an object with or without taking a picture or a video of the object (e.g., just view the image.) In one embodiment, an image may be caused to be presented at a UE 101 by an external source, e.g., a service or a content provider of the system 100. For example, an image of a street on a map application at a UE 101 (e.g., a navigation device) may be caused to be presented by a navigation service provider. In one embodiment, one or more sensors at a UE 101 may determine a user input at the UE 101, wherein the user input may be overlaid or associated with an image presented at the UE 101. In one embodiment, a UE 101 may receive/capture a media item and a user input, which can be communicated to a service or a content provider for further processing or servicing.

In one embodiment, the system 100 processes and/or facilitates a processing of the image data to cause, at least in part, an identification of one or more visual elements. In one embodiment, one or more applications 103 may process the image data by utilizing one or more image detection algorithms, software, programs, or the like, wherein the processed image data may indicate one or more visual elements, e.g., objects, POIs, people, scenery, etc. For example, the image data may be of a coffee table where there may be a plurality of objects thereon, e.g., a coffee cup, a phone, a magazine, a train ticket, etc. In one embodiment, a user may select a specific object present in an image and then input additional user input for associating with the specific object. For example, a user may select the train ticket from the plurality of objects in the image of the coffee table. In one embodiment, the processing may cause a presentation of one or more identified visual elements/objects so that a user or an application may select from the identified objects. In various scenarios, the one or more visual elements may include images of a one or more real world objects or POIs, or the one or more visual elements may include images of one or more objects included in one or more other images. For example, a visual element may be of a public transit bus travelling along a roadway, or the visual element may be of a public transit bus depicted in a picture (e.g., in a magazine, on a bus ticket, etc.)

In one embodiment, the system 100 causes, at least in part, a construction of at least one query based, at least in part, on the content information and the one or more visual elements. In one embodiment, one or more applications at a user device may construct/generate a query based on the content information (e.g., user input) and the visual elements/objects identified in an image at the user device. In one embodiment, one or more applications at the user device may determine information based on one or more associations of the content information and the visual elements, wherein the information may be utilized in constructing the query. For example, an image of a bus stop overlaid by a user input of time, bus route number, or the like, may result in information indicating that the user is seeking information about the bus schedule at that bus stop. In one embodiment, a service or a content provider may use some or all of the query information from a user device for determining the information or construction of the query.

In one embodiment, the system 100 determines at least one screen location of the at least one input with respect to the at least one user interface, wherein the identification of the one or more visual elements is further based, at least in part, on the at least one screen location. In one embodiment, one or more sensors or applications at a user device may detect the location of one or more user inputs with reference to a display at the user device and a visual element that may be presented onto the display. In one scenario, a mobile device may be displaying an image of train, and a user may interact with a UI of the mobile device for inputting one or more information items or selections into the mobile device. For example, the user may utilize a keypad (e.g., physical or virtual), a touch sensitive screen, a microphone, an optical sensor, or the like for inputting the user input, wherein the user input may include selecting the presented image, inputting a textual character, or the like. In one embodiment, the location of the user input at a screen is compared to location of an image that is presented at the screen. In one example, there may be several objects presented at a screen of a user device and a user input may be directed to one of the objects. In one embodiment, the identification of the one or more visual elements is based, at least in part, on an overlapping of the at least one screen location with at least one other screen location associated with the one or more visual elements. In one scenario, a picture displayed at a user device screen may be of a street scene may include a plurality of objects, POIs, people, cars, buses, or the like, and the user input may indicate a selection of one or more of the objects presented at the screen.

In one embodiment, the system 100 determines contextual information associated with at least one device presenting the at least one user interface, at least one user of the at least one device, the content information, the image data, the one or more visual elements, or a combination thereof, wherein the construction of the at least one query is further based, at least in part, on the contextual information. In one embodiment, one or more applications at a user device may determine contextual information based on one or more relations between a user device presenting a UI, a one user of the user device, the content information, the image data, the one or more visual elements, or the like. In one embodiment, the contextual information may be utilized in constructing a query. For example, an image of a taxi-cab overlaid by a user input of "1 hour" may result in determining contextual information indicating that the user would like to request for a taxi-cab to his current location in one hour. In one embodiment, a service or a content provider may use some or all of the query information from a user device for determining the contextual information or construction of the query.

In one embodiment, the system 100 determines one or more services, one or more points of interest, or a combination thereof associated with the one or more visual elements, the image data, the content information, or a combination thereof, wherein the construction of the at least one query is further based, at least in part, on the contextual information. In various scenarios, one or more applications at a user device or at a service/content provider can determine whether one or more services, POIs, content requests, or the like are relevant to a visual element, an image data, content information (e.g., user input), or the like. For example, location information of the user device, a POI identified in the image data, and user activity (e.g., at a meeting, in the office, at home, at a party, etc.) may be utilized to determine a service that may be relevant or of interest to the user. In one embodiment, a service provider may determine the service or POIs as part of a service offered to the user. In one embodiment, a determined service or POI and any associated contextual information may be utilized to construct a query for information associated with the service or the POI.

In one embodiment, the system 100 processes and/or facilitates a processing of the at least one query to determine one or more query results. In various embodiments, a query may be processed by a user device, a service/content provider, etc., wherein the query may indicate a request for information about an object and a user input. In one scenario, the requested information may be determined from information posted, stored, published, a social networking, location service, online map service, or a combination thereof. In one example, a user device may determine the requested information from a local storage device that may contain some or all of the requested information, which may have been previously acquired (e.g., a previous search result). Further, the query results may include additional information that one or more applications at a user device may store for use in future queries. For example, information about the local environment or a POI depicted in a media item may be requested for use while the user is at the current location or future access by the user once the user has changed location.

In one embodiment, the system 100 causes, at least in part, a presentation of the one or more query results as at least one overlay element on the one or more visual elements, one or more other visual elements present in the at least one user interface, or a combination thereof. In one embodiment, search results may be aggregated by one or more applications at a user device, wherein the results may be layered upon one or more visual elements/objects presented at a UI display of the user device. In one embodiment, the presentation is in AR, wherein the user may further interact with the presented information and the visual elements. For example, the user may select a presented object and its associated information for additional or more detailed information.

In one embodiment, the system 100 causes, at least in part, an initiating of one or more requests for one or more services based, at least in part, on the content information, the one or more visual elements, or a combination thereof. In various embodiments, one or more applications at a user device or one or more service/content providers may initiate a request for one or more services, one or more content items, or the like, which may be based on the content information, the visual elements, the contextual information, or the like. For example, an image of a flat tire on an automobile along a roadway overlaid with the user input "help" presented at a display of a user device may cause an application at the user device to initiate a request (e.g., a call, a text message, etc.) for assistance to one or more other users (e.g., contacts in the user device phone directory) or service providers. In one embodiment, a service provider may receive, process, or analyze the content information, the visual elements, or any related contextual information from a user device, wherein the analysis may cause the service provider to initiate one or more services to the user, or to initiate a request for one or more services for the user. In various scenarios, an initiated request may be for a combination of services or contents (e.g., physical or virtual), wherein contextual information at a user device may be monitored for updating the request for the services or contents. For example, in the above flat tire scenario, after initiating a request for assistance with the flat tire, contextual information at the user device may indicate that the user needs other transportation from his current location to another location. For instance, the additional contextual information may be determined from a user input, an application at the user device (e.g., a meeting schedule in a calendar), or a communication message at the user device (e.g., a text message, a voice message, or the like.)

As shown in FIG. 1, in one embodiment, the system 100 includes user equipment (UE) 101a-101n (also collectively referred to as UE 101 and/or UEs 101), which may be utilized to execute one or more applications 103a-103n (also collectively referred to as applications 103) including social networking, web browsing, searching, content sharing, multimedia applications, augmented reality (AR), virtual reality (VR), UI, map application, web client, etc. In various embodiments, the applications 103 may be utilized to scan, capture, process, submit, analyze, select, append, tag, etc. various media items or elements in the media items. For example, an application 103 on a UE 101 may be used to review a digital image and any related information. In various scenarios, the application 103 may facilitate creation and/or consumption of various contents, e.g., viewing images/videos, listening to audio recordings, reading documents, and the like. Additionally, the applications 103 may render and/or facilitate a rendering a presentation of media items including AR and/or VR elements. Further, a UI application may facilitate a receiving or a processing of one or more user inputs, wherein the inputs may be detected via tactile, audio, optical, or the like sensors at a UE 101, and the processing may be partially or completely accomplished at the UE 101.

Additionally, the applications 103 may facilitate communication with other UEs 101, one or more service providers 105a-105n (also collectively referred to as service providers 105), one or more content providers 107a-107n (also collectively referred to as content providers 107), one or more GPS satellites 109a-109n (also collectively referred to as GPS satellites 109), an AR query application 121, and/or with other components of the system 100 directly and/or via communication network 111. In one embodiment, the UEs 101 may include data/content collection modules 115a-115n (also collectively referred to as DC module 115) for determining and/or collecting data and/or content associated with the UEs 101, one or more users of the UEs 101, applications 103, one or more content items (e.g., multimedia content), and the like. In addition, the UEs 101 can execute an application 103 that is a software client for storing, processing, and/or forwarding one or more information items to other components of the system 100.

In various scenarios, the applications 103 and/or the DC module 115 may facilitate presentation or selection detection of various elements present in a media item and/or may facilitate creating or associating metadata with the media item. Additionally, the applications 103 or the DC module 115 may determine contextual information based on a media item presented at a UE 101 and any user inputs associated therewith.

In one embodiment, the service providers 105 may include and/or have access to one or more service databases 117a-117n (also collectively referred to as service database 117), which may include various user information, user profiles, user preferences, one or more profiles of one or more user devices (e.g., device configuration, sensors information, etc.), service providers 105 information, other service providers' information, and the like. In one embodiment, the service providers 105 may include one or more service providers offering one or more services, for example, search services, online shopping, social networking services (e.g., blogging), content sharing, media upload, media download, media streaming, account management services, or a combination thereof. Further, the service providers 105 may conduct a search for content items, media items, information, coupons, and the like associated with one or more users, POIs, geo-locations, and the like. In one embodiment, a service provider 105 may receive and process a request/input from a user device for determining information associated with one or more elements present in one or more media items. In one embodiment, the service provider 105 may utilize various algorithms, software applications, modules, hardware, firmware, and the like for processing, recognizing, detecting, comparing, and the like, content items (e.g., media items) that may be associated with a user, a user device, or the like.

In one embodiment, the content providers 107 may include and/or have access to one or more content database 119a-119n (also collectively referred to as content database 119), which may store, include, and/or have access to various content items. For example, the content providers 107 may store content items (e.g., at the content database 119) provided by various users, various service providers, crowd-sourced content, and the like. Further, the service providers 105 and/or the content providers 107 may utilize one or more service application programming interfaces (APIs)/integrated interface, through which communication, media, content, and information (e.g., associated with users, applications, services, content, etc.) may be shared, accessed and/or processed.

In various embodiments, the service providers 105 and/or the content providers 107 may include and/or have access to information associated with people, POIs, objects, etc. For example, the information may be available from various public, private, or government controlled databases, which may be accessed via the communication network 111.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, loud speakers, display monitors, radio broadcast receiver, electronic book device, game device, wrist watch, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

In one embodiment, the UE 101 includes a location module/sensor that can determine the UE 101 location (e.g., a user's location). The UE 101 location may be determined by a triangulation system such as a GPS, assisted GPS (A-GPS), Cell of Origin, wireless local area network triangulation, or other location extrapolation technologies. Standard GPS and A-GPS systems can use the one or more satellites 109 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module/sensor may also utilize multiple technologies to detect the location of the UE 101. GPS coordinates can provide finer detail as to the location of the UE 101. In another embodiment, the UE 101 may utilize a local area network (e.g., LAN, WLAN) connection to determine the UE 101 location information, for example, from an Internet source (e.g., a service provider).

By way of example, the communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the service providers 105 and the content providers 107 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UEs 101, the service providers 105, and the content providers 107, may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. It is also noted that the role of a client and a server is not fixed; in some situations a device may act both as a client and a server, which may be done simultaneously and/or the device may alternate between these roles.

Figure 2:
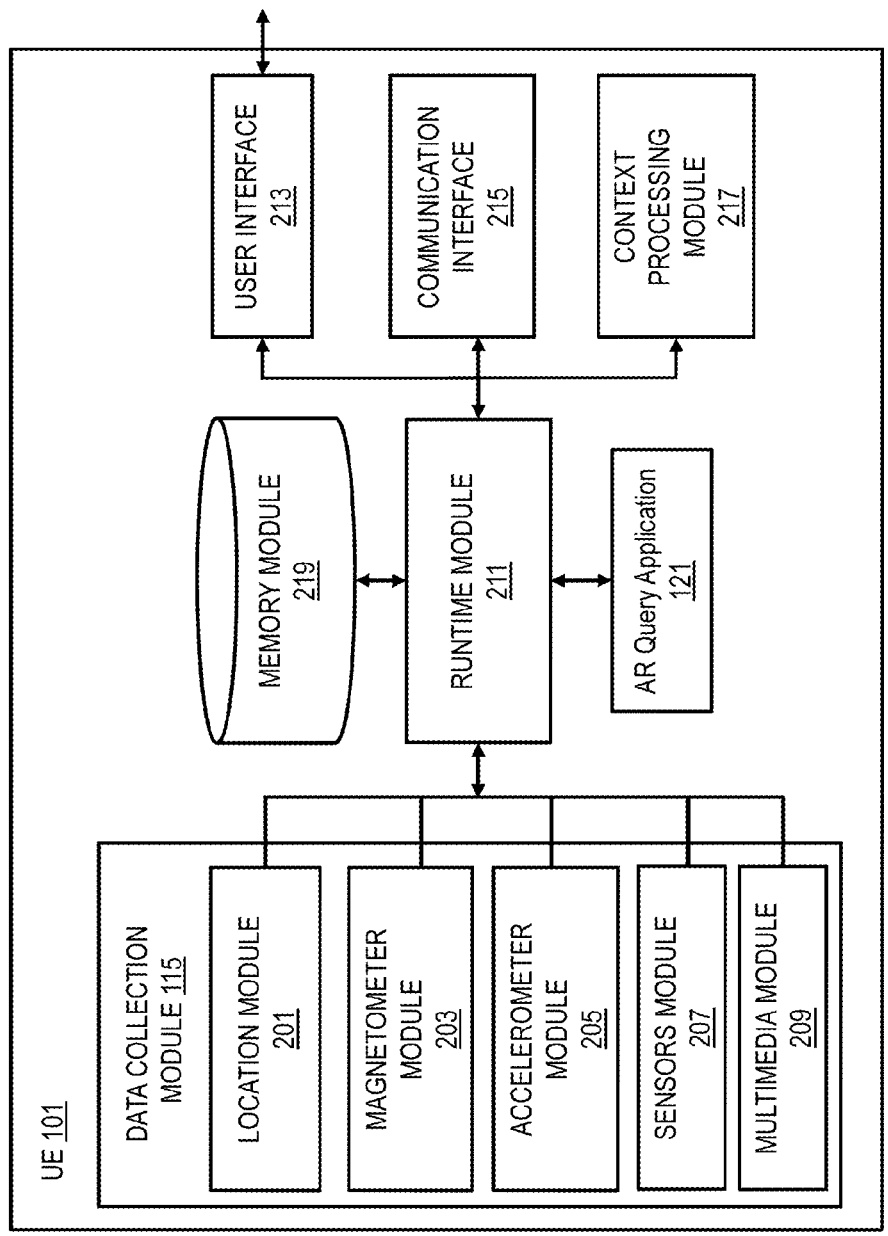
FIG. 2 is a diagram of components of a user equipment capable of initiating or continuing a contextual query based on visual elements and user input in augmented reality at a device, according to an embodiment.

FIG. 2 is a diagram of the components of a user equipment capable of initiating or continuing a contextual query based on visual elements and user input in augmented reality at a device, according to an embodiment. By way of example, a UE 101 includes one or more components for initiating or continuing a contextual query, which may be based on contextual information or relationship determined among content at a device, user input, user profile, device profile, or the like. It is contemplated that the functions of these components may be combined in one or more components or performed by other components of equivalent functionality. In this embodiment, the UE 101 includes a DC module 115 that may include one or more location modules 201, magnetometer modules 203, accelerometer modules 205, sensors module 207, and multimedia module 209. Further, the UE 101 may also include a runtime module 211 to coordinate the use of other components of the UE 101, a user interface 213, a communication interface 215, a context processing module 217, and a memory module 219. The applications 103 of the UE 101 can execute on the runtime module 211 utilizing the components of the UE 101. In various embodiments, a UE 101 may utilize available hardware and software for enabling a user interaction in an AR or VR environment. Additionally, a UE 101 may interface with one or more other UEs 101 (e.g., active wearable UEs, head-mounted sensors, eyeglasses, contact lenses, gloves, etc.) for enabling the user interaction.

The location module 201 can determine a user's location, for example, via location of a UE 101. The user's location can be determined by a triangulation system such as GPS, assisted GPS (A-GPS), Cell of Origin, or other location extrapolation technologies. Standard GPS and A-GPS systems can use satellites 109 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory module 219 and are available to the context processing module 217, the DC module 115, the service providers 105, and/or to other entities of the system 100 (e.g., via the communication interface 215.) Moreover, in certain embodiments, the GPS coordinates can include an altitude to provide a height. In other embodiments, the altitude can be determined using another type of altimeter. In certain embodiments, the location module 201 can be a means for determining a location of the UE 101, an image, or data used to associate an object in view with a location.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory module 219, made available to other modules and/or applications 103 of the UE 101, and/or transmitted via the communication interface 215 to one or more entities of the system 100.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In certain embodiments, the magnetometer module 203 and accelerometer module 205 can be means for ascertaining a perspective of a user. This perspective information may be stored in the memory module 219, made available to other modules and/or applications 103 of the UE 101, and/or sent to one or more entities of the system 100.

In various embodiments, the sensors module 207 can process sensor data from various sensors (e.g., GPS, accelerometer, gyroscope, thermometer, etc.) to determine environmental (e.g., atmospheric) conditions surrounding the UE 101, user mood (e.g., hungry, angry, tired, etc.), location information, and various other information from a range sensors that may be available on one or more devices. For example, the sensors module 207 may detect conditions including humidity, temperature, geo-location, biometric data of the user, etc. Once again, this information can be stored in the memory module 219 and sent to the context processing module 217 and/or to other entities of the system 100. In certain embodiments, information collected from the DC collection module 115 can be retrieved by the runtime module 211 and stored in memory module 219, made available to other modules and/or applications 103 of the UE 101, and/or sent to one or more entities of the system 100. The sensors module 207 may function to determine related objects by processing sensor data from an imaging device, one or more other devices, or a combination thereof. Such sensor data may be transmitted via synchronization signals from/to one or more other devices. Furthermore, the sensors module 207 may determine field-of-view at a UE 101 display, which may present one or more element, objects, people, POIs, or the like. Additionally, the elements/objects may be associated with one or more subjects, location information, or the like that may be pre-determined and embedded in the image data.

In one embodiment, the multimedia module 209 may be utilized to capture various media items, for example, graphical encoded data representations, images, video, audio, and the like, wherein the captured media may be submitted to one or more modules and applications of the UE 101, a service provider, and/or a content provider for further processing, storage, sharing, and the like. For example, an image of an object in a view-finder of a camera at the UE 101 or a captured image of the object stored at the UE 101 may be submitted to a service provider and/or to the context processing module 217 for processing or analysis. In one embodiment, the multimedia module 209 may also be utilized to process various media items for determining one or more elements present in the media item. For example, a media item may be a picture that includes images of people, POIs, objects, buildings, etc. In one embodiment, the multimedia module 209 may use one or more image processing algorithms for processing a media item and for identifying one or more elements present therein.

In various embodiments, the runtime module 211 may operate in conjunction with one or more modules/components of a UE 101 to facilitate or manage the enabling of a query based on visual elements and user input in augmented reality at a UE 101.

The user interface 213 can include various methods for a user to interact with a UE 101. For example, the user interface 213 can have outputs including a visual component (e.g., a screen), an audio component, a physical component (e.g., vibrations), or other methods for UI. User inputs may be via a touch-screen interface, a scroll-and-click interface, a button interface, a microphone, a camera, or the like, wherein the user inputs may include audio, video, physical gestures, text, or the like. For example, the UI module 213 may detect an object/element in an image that has been selected by a user, or additional input by the user. In one scenario, the UI module 213 may recognize a user touching a screen and selecting a point comprised of a number of pixels, wherein the pixels touched may be associated with a given element/object.

In one embodiment, the communication interface 215 can be used to communicate with one or more entities of the system 100. Certain communications can be via methods such as an internet protocol, messaging (e.g., SMS, MMS, etc.), or any other communication method (e.g., via the communication network 111). In some examples, the UE 101 can send context information associated with the UE 101 to the service providers 105, content providers 107, and/or to other entities of the system 100.

The context processing module 217 may be utilized in determining context information from the DC module 115 and/or applications 103 executing on the runtime module 211. This information may be caused to be transmitted, via the communication interface 215, to the service providers 105 and/or to other entities of the system 100. The context processing module 217 may additionally be utilized as a means for determining information related to the user, an instance of data, a value, a content item, an object, a subject, location information, and the like. In certain embodiments, the context processing module 217 can infer higher level context information from the context data such as favorite locations, significant places, common activities, interests in products and services, POIs at various geo-locations, priority level, etc.

Figure 3:
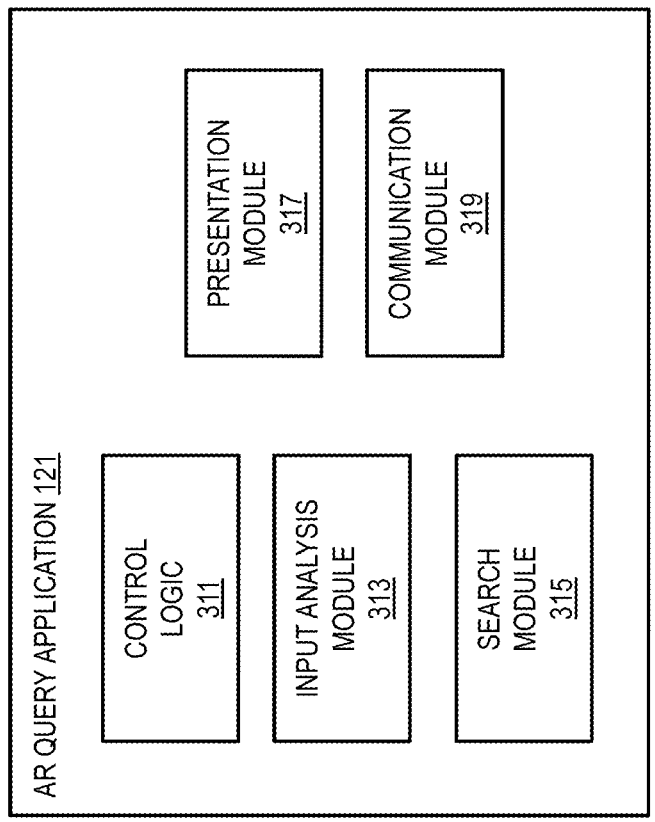
FIG. 3 is a diagram of components of an AR query application, according to an embodiment.

FIG. 3 is a diagram of the components of the AR query application, according to an embodiment. By way of example, the AR query application 121 includes one or more components for initiating or continuing a contextual query based on visual elements and user input in augmented reality at a device. It is contemplated that the functions of these components may be combined in one or more components or performed by other components of equivalent functionality. In this embodiment, the AR query application 121 includes a control logic 311, an input analysis module 313, a query module 315, a presentation module 317, and a communication module 319. In various embodiments, the AR query application 121 may be implemented as a stand-alone element of the system 100, or may be partially or completely implemented in a UE 101, at a service provider 105, or at a content provider 107.

The control logic 311 may oversee tasks, including tasks performed by the other modules 203 where, for example, although the other modules may perform the actual task, the control logic 311 may determine when and how those tasks are performed or otherwise direct the other modules to perform the tasks.

In one embodiment, the control logic 311 and the input analysis module 313 may determine a query request/input from a user for determining information associated with one or more elements present in a media item. For example, the input may be a picture including one or more elements/objects and one or more user inputs (e.g., additional information). In one embodiment, the input analysis module 313 may utilize one or more suitable applications, image recognition algorithms, or software to process the media item and determine one or more elements present in the media item. For example, the media item may be a picture or a video recording. In one scenario, a video recording may be analyzed to determine various images of elements that may have been captured in the recording. In one embodiment, the image recognition may identify distinct characteristics associated with an element present in the media item. In one use case scenario, the input analysis module 313 may determine and sort the information associated with a plurality of elements present in a media item so that any relevant associated information may be determined for each or a selected element. In one embodiment, a user may select one or more elements present in a media item for the processing and to include in a query for information, services, or contents associated with the elements. In one embodiment, the input analysis module 313 may indicate to a user whether it has detected any elements in a given media item. For example, it is possible that one or more elements present in a media item are not detected, which may be due to one or more parameters associated with the media item, e.g., picture quality. In one embodiment, the input may include one or more information items provided by a user. For example, the input may be in the form of text, audio, gestures, device movement, or the like, that are to be included in and considered in conjunction with a media item. In one scenario, a user may utilize a UE 101 to capture a picture of a coffee maker at his home and then, via an AR UI, input/draw a question mark on top of the image displayed at his UE 101 screen. In one scenario, the input analysis module 313 may infer contextual information that the user may be interested in finding a nearby coffee vendor (e.g., a café, a restaurant, etc.) In various embodiments, the input analysis module 313 may generate contextual information based on the one or more parameters; for example, an object selected in a media item, additional user input, user profile, device profile, location information, time/date, any potential current event associated with the user or the user location, or the like. In one embodiment, the contextual information may be based on one or more relations among the one or more parameters. For example, a relation between an object in a picture and the user location, or a relation between the object and a current event (e.g., a conference) associated with the user.

In one embodiment, the control logic 311 and query module 315 may utilize contextual information from the input analysis module 313 to conduct one or more searches for information associated with one or more objects selected in a media item and the user input. In various scenarios, various available databases (e.g., public, private, governmental, social networking, etc.) may be accessed and utilized to conduct the one or more searches. In one embodiment, one or more credentials associated with a user who is requesting the information may be requested and utilized for accessing the various available databases. For example, a user may have requested information associated with restricted access to a social networking account, wherein access to that information may require the user's credentials to the social networking site. In one embodiment, a metadata (e.g., object type, location, vendor, date/time, etc.) associated with a certain object in a media item may be utilized to determine contextual relation to a user input for conducting a query via one or more potential databases. In one use case scenario, image recognition information associated with one or more other media items that may be similar to a media item of interest and user input may be utilized to determine the contextual information. The query module 315 may request for information that may be determined from information posted, stored, published, featured or otherwise broadcast to one or more subscribers of a service, e.g., a social networking, location service, online map service, or a combination thereof. In a further embodiment, the query module may generate a contextual query based on an object in a media item and a user input at a UE 101 specifying one or more associations between the object, the user input, and an environment depicted in the media item, wherein the information may include real-time information, historical information, or a combination thereof.

In one embodiment, the presentation module 317 may cause a presentation of the query information associated with one or more objects in a media item, wherein the presentation may be via one or more applications, modules, or software at one or more user devices. In one example, the presentation may include visual effects on the one or more objects and/or on the media item. In various scenarios, the presentation may include one or more AR or VR elements, which may provide additional visual effects for a better or more effective user experience. In one embodiment, the presentation module 317 may cause a presentation of a UI at a user device so that a user may interact with one or more objects in a media item, in one or more other media items, or to input one or more user query or feedback parameters. In one embodiment, the UI may provide various options for a user to select (e.g., highlight, hover over, or the like), one or more objects in a media item and/or to input user input (e.g., audio, text, etc.)

In one embodiment, the communication module 319 can be used to communicate with one or more entities of the system 100. Certain communications can be via methods such as an internet protocol, messaging (e.g., SMS, MMS, etc.), or any other communication method (e.g., via the communication network 111). In some examples, the AR query application 121 may receive context information associated with a UE 101, query parameters, user information, media items, user interactions, or the like, from a UE 101, the service providers 105, the content providers 107, and/or from other entities of the system 100.

Figure 4:
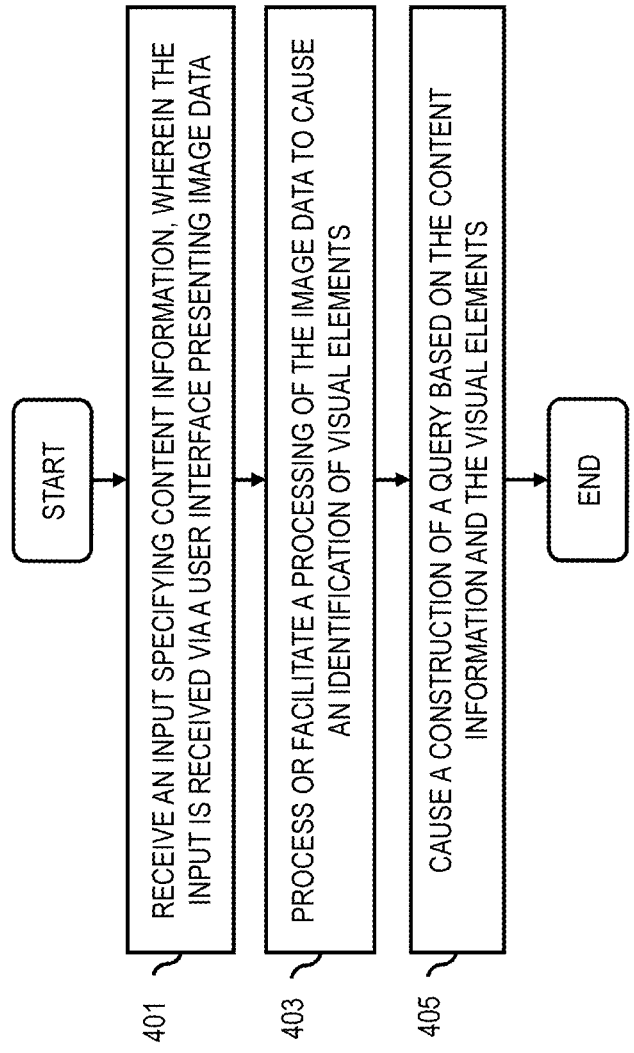
FIGS. 4 through 6 illustrate flowcharts of various processes for, at least, enabling contextual queries based on visual elements and user input in augmented reality at a device, according to various embodiments.
Figure 5:
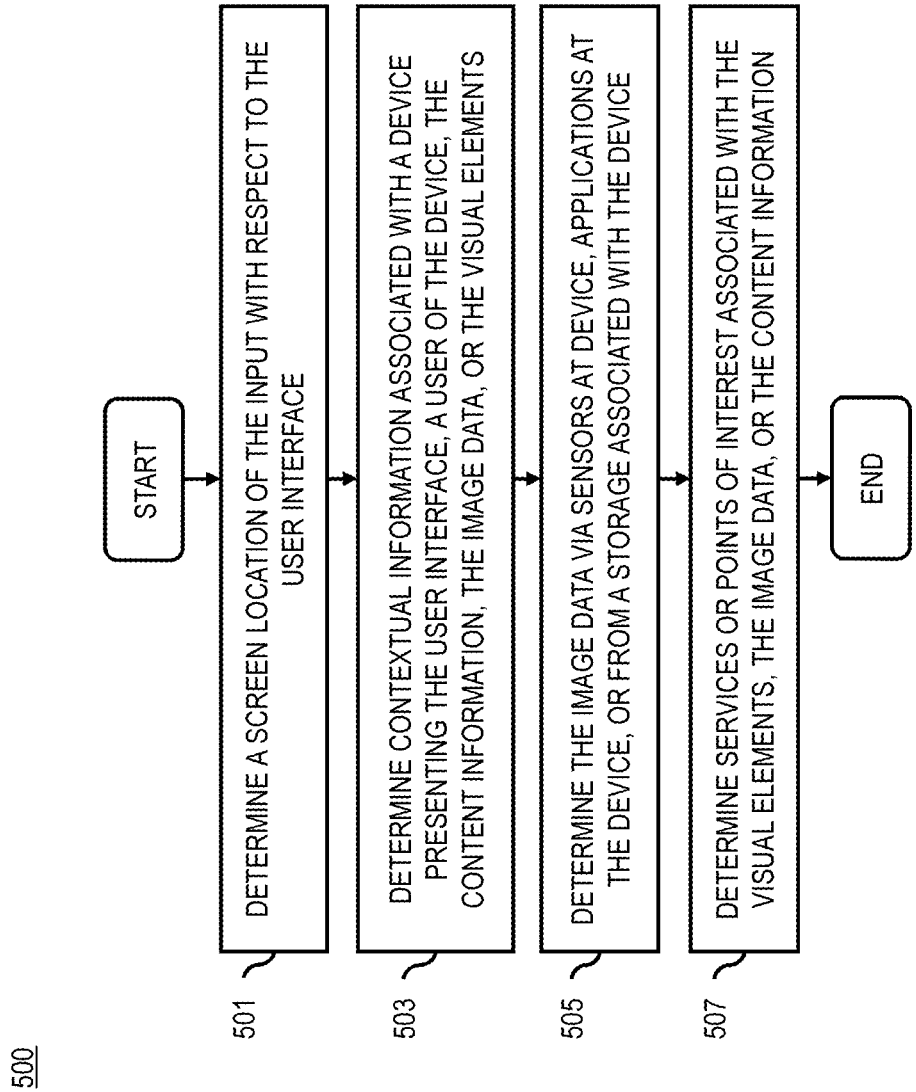
Figure 6:
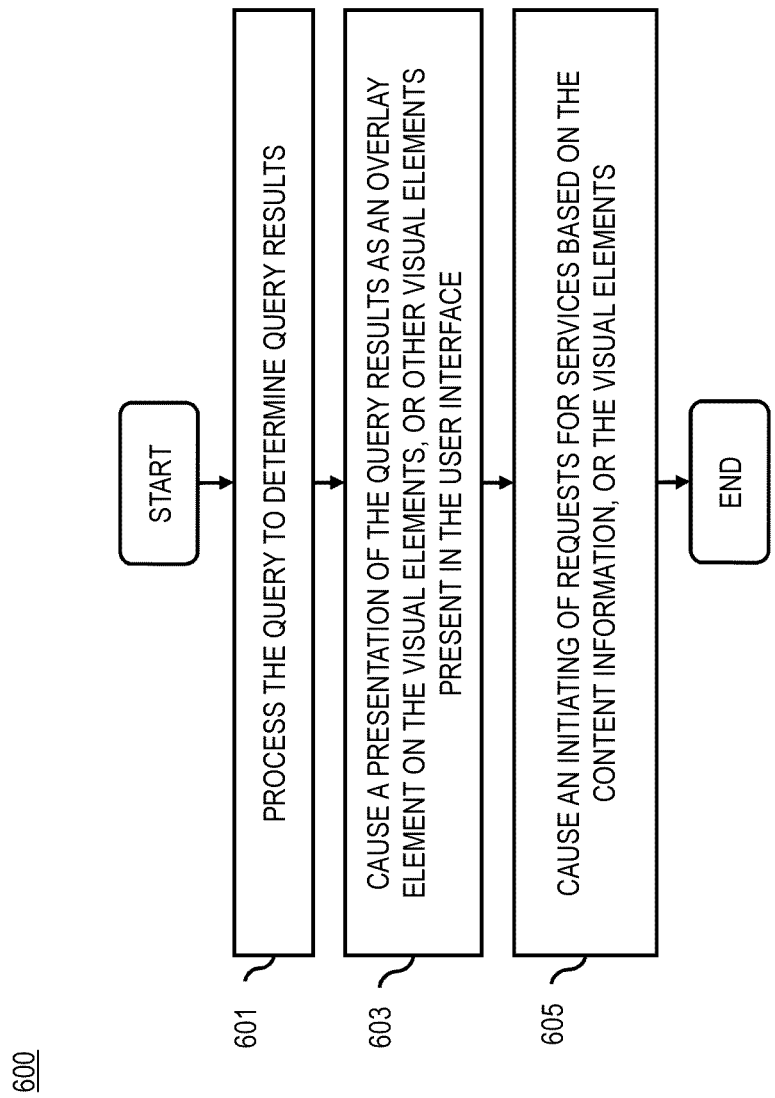
Figure 9:
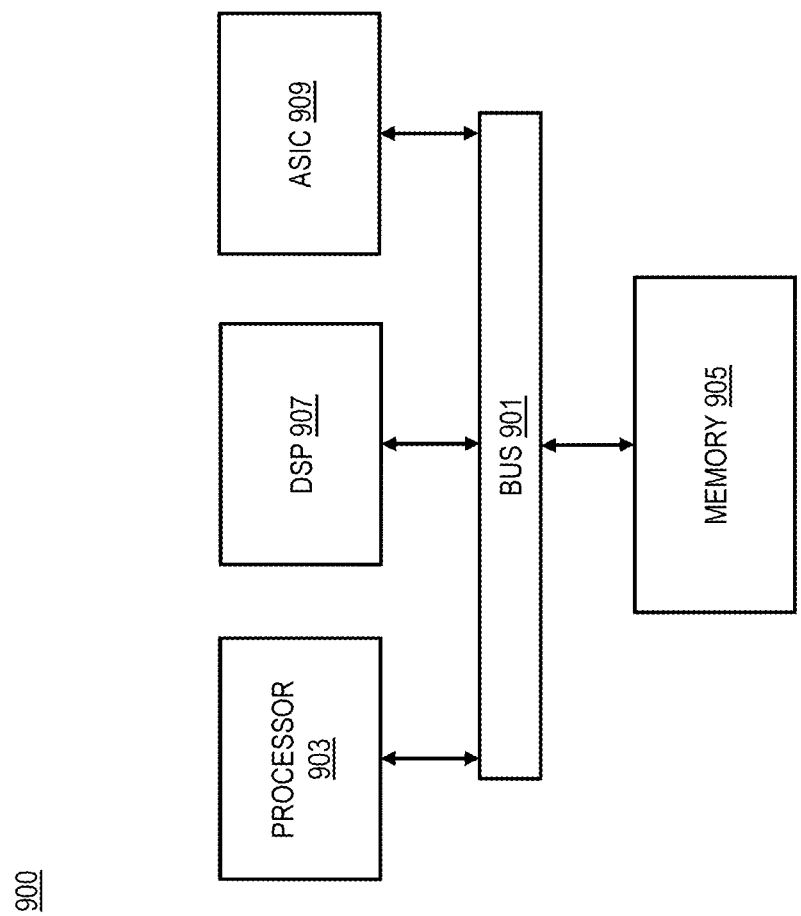
FIG. 9 is a diagram of a chip set that can be used to implement an embodiment of the invention.

FIGS. 4 through 6 illustrate flowcharts of various processes for, at least, enabling contextual queries based on visual elements and user input in augmented reality at a device, according to various embodiments. In various embodiments, an AR query application 121 may perform processes 400, 500, and 600 that may be implemented in, for instance, a chip set including a processor and a memory as shown in FIG. 9. As such, the UE 101 and/or the AR query application 121 can provide means for accomplishing various parts of the process 400, 500, and 600 as well as means for accomplishing other processes in conjunction with other components of the system 100. Throughout this process, the AR query application 121 may be referred to as completing various portions of the processes 400, 500, and 600; however, it is understood that other components of the system 100 can perform some or all of the process steps.

Referring to FIG. 4, the process 400 begins at step 401 where the AR query application 121 may receive at least one input specifying content information, wherein the input is received via at least one user interface presenting image data. In one embodiment, the at least one user interface includes, at least in part, at least one AR user interface. In one embodiment, one or more applications 103 or an AR query application 121 may receive a user input or content information from one or more sensors or a UI element at a UE 101. In one embodiment, the content information is determined from a user tactile input, a user audio input, a user gaze information, a user activity, one or more applications of at least one device, or a combination thereof. For instance, the content information may be determined from a user's interaction with a touch sensitive display, a keyboard, a microphone, an optical sensor, or a magnetometer. For example, a user may sketch/write onto a touch screen on a mobile device. Also, the content information may be determined from data associated with one or more applications 103, e.g., a calendar application, a social networking application, or the like. In one embodiment, an image may be caused to be presented at a UE 101 by an external source, e.g., a service or a content provider of the system 100. For example, an image of a street on a map application at a UE 101 (e.g., a navigation device) may be caused to be presented by a navigation service provider. In one embodiment, one or more sensors at a UE 101 may determine a user input at the UE 101, wherein the user input may be overlaid or associated with an image presented at the UE 101. In one embodiment, a UE 101 may receive/capture a media item and a user input, which can be communicated to a service or a content provider for further processing or servicing.

In step 403, the AR query application 121 may process and/or facilitates a processing of the image data to cause, at least in part, an identification of one or more visual elements. In one embodiment, one or more applications 103 may process the image data by utilizing one or more image detection algorithms, software, programs, or the like, wherein the processed image data may indicate one or more visual elements, e.g., objects, POIs, people, scenery, etc. For example, the image data may be of a coffee table where there may be a plurality of objects thereon, e.g., a coffee cup, a phone, a magazine, a train ticket, etc. In one embodiment, a user may select a specific object present in an image and then input additional user input for associating with the specific object. For example, a user may select the train ticket from the plurality of objects in the image of the coffee table. In one embodiment, the processing may cause a presentation of one or more identified visual elements/objects so that a user or an application may select from the identified objects. In various scenarios, the one or more visual elements may include images of a one or more real world objects or POIs, or the one or more visual elements may include images of one or more objects included in one or more other images. For example, a visual element may be of a public transit bus travelling along a roadway, or the visual element may be of a public transit bus depicted in a picture (e.g., in a magazine, on a bus ticket, etc.)

In step 405, the AR query application 121 may cause, at least in part, a construction of at least one query based, at least in part, on the content information and the one or more visual elements. In one embodiment, one or more applications at a user device may construct/generate a query based on the content information (e.g., user input) and the visual elements/objects identified in an image at the user device. In one embodiment, one or more applications at the user device may determine information based on one or more associations of the content information and the visual elements, wherein the information may be utilized in constructing the query. For example, an image of a bus stop overlaid by a user input of time, bus route number, or the like, may result in information indicating that the user is seeking information about the bus schedule at that bus stop. In one embodiment, a service or a content provider may use some or all of the query information from a user device for determining the information or construction of the query.

Referring to FIG. 5, the process 500 begins at step 501 where the AR query application 121 may determines at least one screen location of the at least one input with respect to the at least one user interface, wherein the identification of the one or more visual elements is further based, at least in part, on the at least one screen location. In one embodiment, one or more sensors or applications at a user device may detect the location of one or more user inputs with reference to a display at the user device and a visual element that may be presented onto the display. In one scenario, a mobile device may be displaying an image of train, and a user may interact with a UI of the mobile device for inputting one or more information items or selections into the mobile device. For example, the user may utilize a keypad (e.g., physical or virtual), a touch sensitive screen, a microphone, an optical sensor, or the like for inputting the user input, wherein the user input may include selecting the presented image, inputting a textual character, or the like. In one embodiment, the location of the user input at a screen is compared to location of an image that is presented at the screen. In one example, there may be several objects presented at a screen of a user device and a user input may be directed to one of the objects. In one embodiment, the identification of the one or more visual elements is based, at least in part, on an overlapping of the at least one screen location with at least one other screen location associated with the one or more visual elements. In one scenario, a picture displayed at a user device screen may be of a street scene may include a plurality of objects, POIs, people, cars, buses, or the like, and the user input may indicate a selection of one or more of the objects presented at the screen.

In step 503, the AR query application may determine contextual information associated with at least one device presenting the at least one user interface, at least one user of the at least one device, the content information, the image data, the one or more visual elements, or a combination thereof, wherein the construction of the at least one query is further based, at least in part, on the contextual information. In one embodiment, one or more applications at a user device may determine contextual information based on one or more relations between a user device presenting a UI, a one user of the user device, the content information, the image data, the one or more visual elements, or the like. In one embodiment, the contextual information may be utilized in constructing a query. For example, an image of a taxi-cab overlaid by a user input of "1 hour" may result in determining contextual information indicating that the user would like to request for a taxi-cab to his current location in one hour. In one embodiment, a service or a content provider may use some or all of the query information from a user device for determining the contextual information or construction of the query.

In step 505, the AR query application 121 may determine the image data via one or more sensors at the at least one device, one or more applications at the at least one device, from a storage associated with the at least one device, or a combination thereof. In one embodiment, a user may utilize a camera sensor and a multimedia application at a UE 101 to capture the image data, which may be an image of an object, a POI, or the like, which may be presented via a UI display at the UE 101. In one embodiment, the image data may include an image that is retrieved from a local or a remote storage device. In one embodiment, an image may be temporarily captured via a view finder of a camera sensor and then presented at the UI display of the UE 101, wherein a user may interact with the image. For example, a user may enable a camera sensor at a UE 101 and then point the UE 101 at an object with or without taking a picture or a video of the object (e.g., just view the image.)

In step 507, the AR query application 121 may determine one or more services, one or more points of interest, or a combination thereof associated with the one or more visual elements, the image data, the content information, or a combination thereof, wherein the construction of the at least one query is further based, at least in part, on the contextual information. In various scenarios, one or more applications at a user device or at a service/content provider can determine whether one or more services, POIs, content requests, or the like are relevant to a visual element, an image data, content information (e.g., user input), or the like. For example, location information of the user device, a POI identified in the image data, and user activity (e.g., at a meeting, in the office, at home, at a party, etc.) may be utilized to determine a service that may be relevant or of interest to the user. In one embodiment, a service provider may determine the service or POIs as part of a service offered to the user. In one embodiment, a determined service or POI and any associated contextual information may be utilized to construct a query for information associated with the service or the POI.

Referring to FIG. 6, the process 600 begins at step 601 where the AR query application 121 may process and/or facilitate a processing of the at least one query to determine one or more query results. In various embodiments, a query may be processed by a user device, a service/content provider, etc., wherein the query may indicate a request for information about an object and a user input. In one scenario, the requested information may be determined from information posted, stored, published, a social networking, location service, online map service, or a combination thereof. In one example, a user device may determine the requested information from a local storage device that may contain some or all of the requested information, which may have been previously acquired (e.g., a previous search result). Further, the query results may include additional information that one or more applications at a user device may store for use in future queries. For example, information about the local environment or a POI depicted in a media item may be requested for use while the user is at the current location or future access by the user once the user has changed location.

In step 603, the AR query application 121 may cause, at least in part, a presentation of the one or more query results as at least one overlay element on the one or more visual elements, one or more other visual elements present in the at least one user interface, or a combination thereof. In one embodiment, search results may be aggregated by one or more applications at a user device, wherein the results may be layered upon one or more visual elements/objects presented at a UI display of the user device. In one embodiment, the presentation is in AR, wherein the user may further interact with the presented information and the visual elements. For example, the user may select a presented object and its associated information for additional or more detailed information.

In step 605, the AR query application 121 may cause, at least in part, an initiating of one or more requests for one or more services based, at least in part, on the content information, the one or more visual elements, or a combination thereof. In various embodiments, one or more applications at a user device or one or more service/content providers may initiate a request for one or more services, one or more content items, or the like, which may be based on the content information, the visual elements, the contextual information, or the like. For example, an image of a flat tire on an automobile along a roadway overlaid with the user input "help" presented at a display of a user device may cause an application at the user device to initiate a request (e.g., a call, a text message, etc.) for assistance to one or more other users (e.g., contacts in the user device phone directory) or service providers. In one embodiment, a service provider may receive, process, or analyze the content information, the visual elements, or any related contextual information from a user device, wherein the analysis may cause the service provider to initiate one or more services to the user, or to initiate a request for one or more services for the user. In various scenarios, an initiated request may be for a combination of services or contents (e.g., physical or virtual), wherein contextual information at a user device may be monitored for updating the request for the services or contents. For example, in the above flat tire scenario, after initiating a request for assistance with the flat tire, contextual information at the user device may indicate that the user needs other transportation from his current location to another location. For instance, the additional contextual information may be determined from a user input, an application at the user device (e.g., a meeting schedule in a calendar), or a communication message at the user device (e.g., a text message, a voice message, or the like.)

FIGS. 7A through 7E illustrate example UI diagrams utilized in the processes of the FIGS. 4 through 6, according to various embodiments.

Figure 7A:
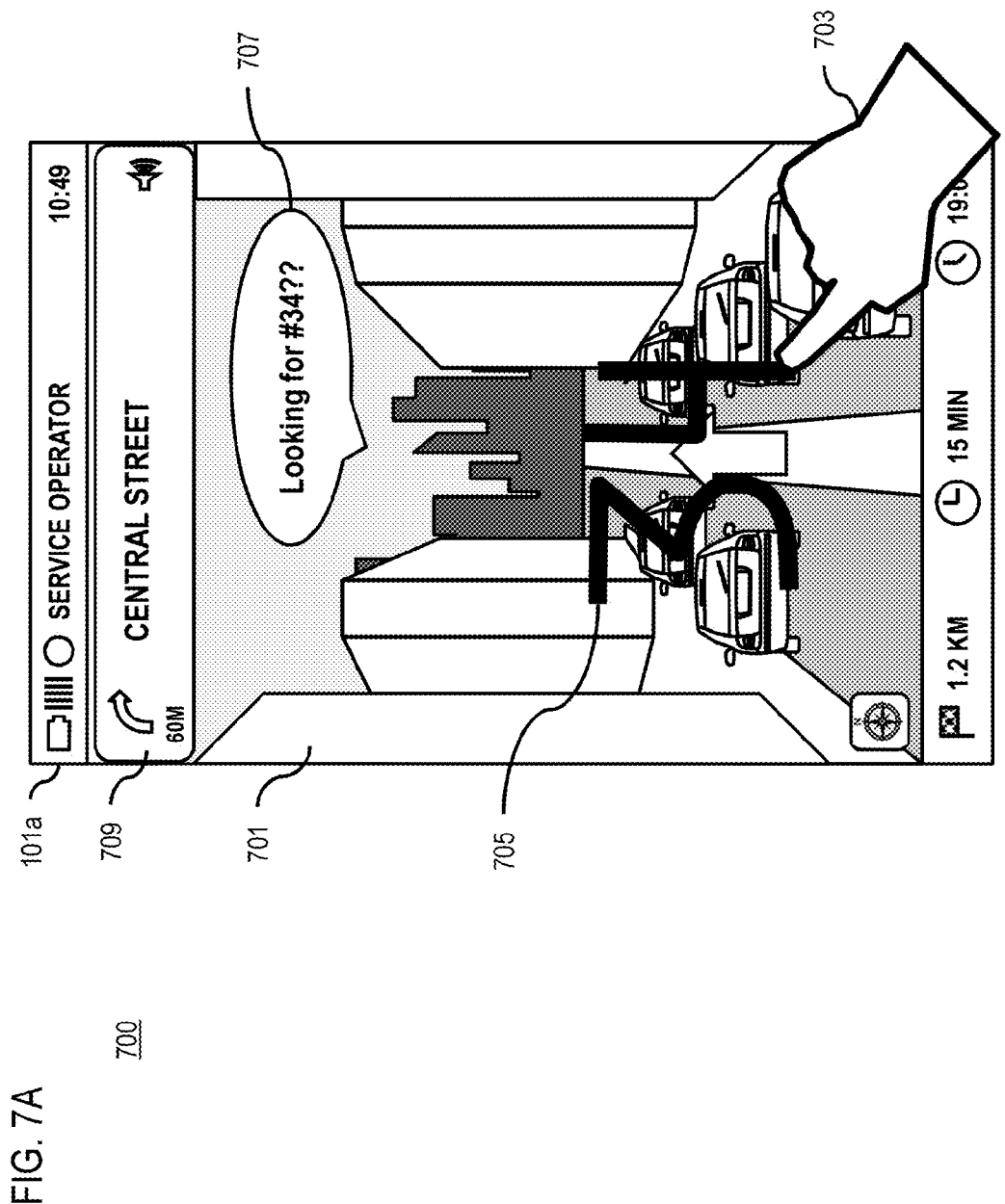

FIG. 7A includes example UI illustration 700 which depicts a UE 101a. In one example, the UI display at the UE 101a presents image data that includes a UI display 701 of a map application depicting a current navigation route associated with the UE 101a (e.g., a navigation system in a vehicle.), wherein the location information can be determined by one or more applications 103. In one embodiment, a user 703 may interact with the UI at the UE 101a for inputting content information 705. In one example, the user 703 writes/sketches the number "34" via a touchscreen display at the UE 101a. In various scenarios, the user may utilize one or more other UI options for inputting the content information, for example, by typing on a keypad, speaking into a microphone, gesturing at an optical or a motion sensor, or the like. In one embodiment, the AR query application 121 at the UE 101a may construct contextual information based on the image of the navigation route and the content information number "34" for initiating a query for information about a POI (e.g., a building) located at number 34 along the navigation route displayed in the UI display 701. In one scenario, one or more applications at the UE 101a may present a message or a UI prompt 707 that may provide or request additional information to/from the user. In one example, the UI prompt 707 is asking the user to confirm whether the user is "looking for #34??", wherein the user may confirm or provide other information via one or more UI elements at the UE 101a. In one scenario, a service provider or an application at the UE 101a may determine and provide navigation information 709 to the POI at number "34". In one embodiment, a user may provide the content information (e.g., "34") to initiate a query or to continue with a query already in progress. For example, the image data in 701 may be a presentation of the environment at a current location of the UE 101a, or the image data may be navigation information based on an earlier query (e.g., for navigation information to one or more POIs.)

FIG. 7B includes example UI illustration 720 where a UE 101a is utilized to capture an image or display an image of a POI 721 via the UI display 701. In one embodiment, one or more applications at the UE 101a or at a service provider may process the image data of the POI 721 to identify a visual element/object. For example, a portion of the image data 721 presented in the UI display 701 is determined to include an image of a bus-stop 723. Further, one or more sensors at the UE 101a may determine content information 725, "110", input by the user 703. In one scenario, the UE 101a may use AR to overlay the user input "110" onto the image of the bus-stop 723. In one example, the AR query application or the applications 103 may present a UI prompt 707 to the user for confirming whether the user is "looking for info on bus route 110??", wherein the user may confirm or further interact with the UE 101a via one or more UI elements.

Figure 7C:
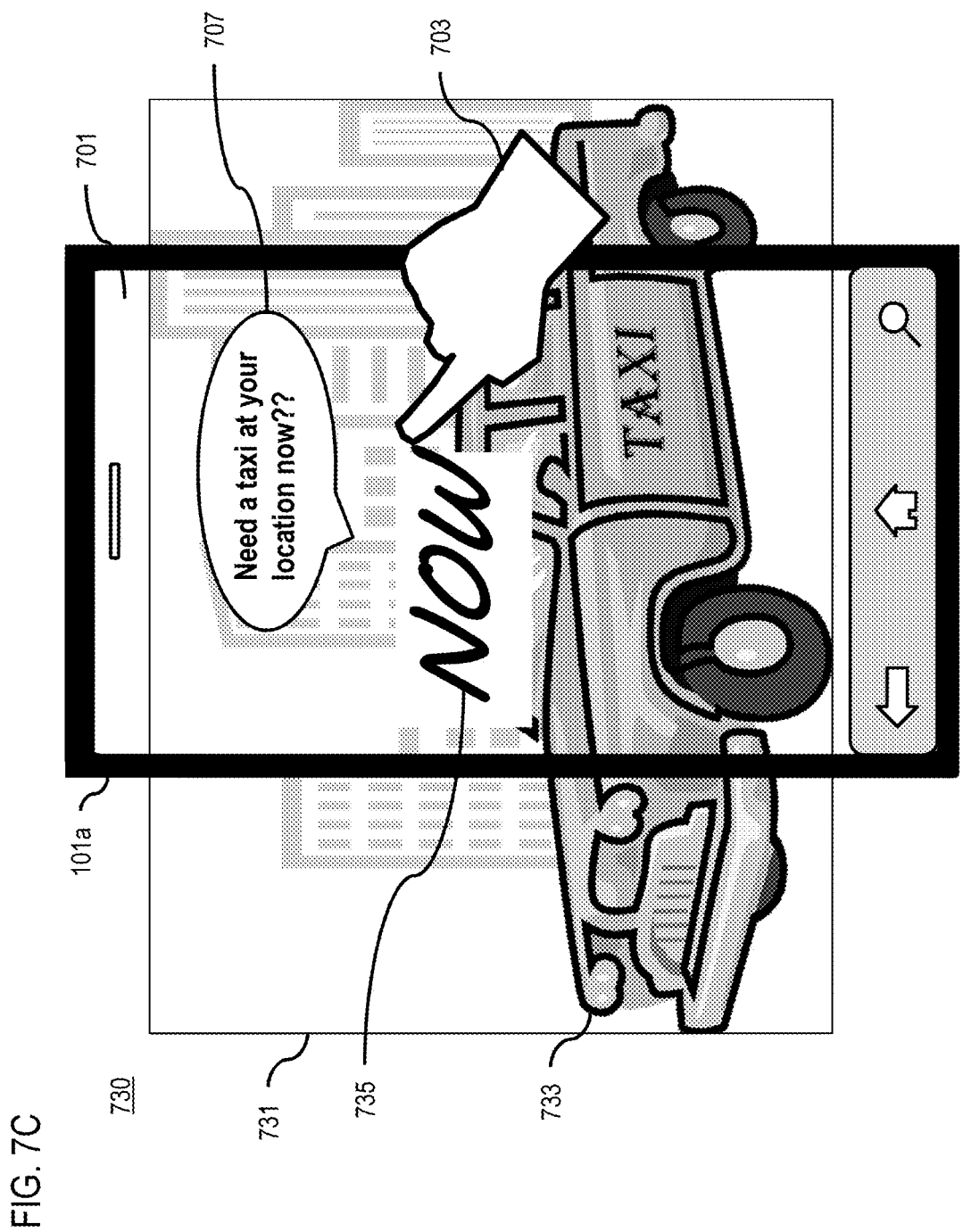

FIG. 7C includes example UI illustration 730 where a UE 101a is utilized to capture an image or display an image of a POI 731 via the UI display 701. In one embodiment, one or more applications at the UE 101a or at a service provider may process the image data of the POI 731 to identify a visual element/object. For example, the image data of the POI 731 presented in the UI display 701 can be determined to be an image of a street that includes a visual element 733, which is a taxi. Further, one or more sensors at the UE 101a may determine content information 735, "NOW", which is input by the user 703 (e.g., via a touch screen display.) In one scenario, the UE 101a may use AR to overlay the user input "NOW" onto the image of the taxi 733. In one example, the AR query application or the applications 103 may present a UI prompt 707 to the user for confirming whether the user is "Need a taxi at your location now??", wherein the user may confirm or further interact with the UE 101a via one or more UI elements. In one scenario, contextual information may include information from one or more applications at the UE 101a, for example, a calendar application indicating an upcoming event at a POI that may require a transportation service (e.g., a taxi service)

Figure 7D:
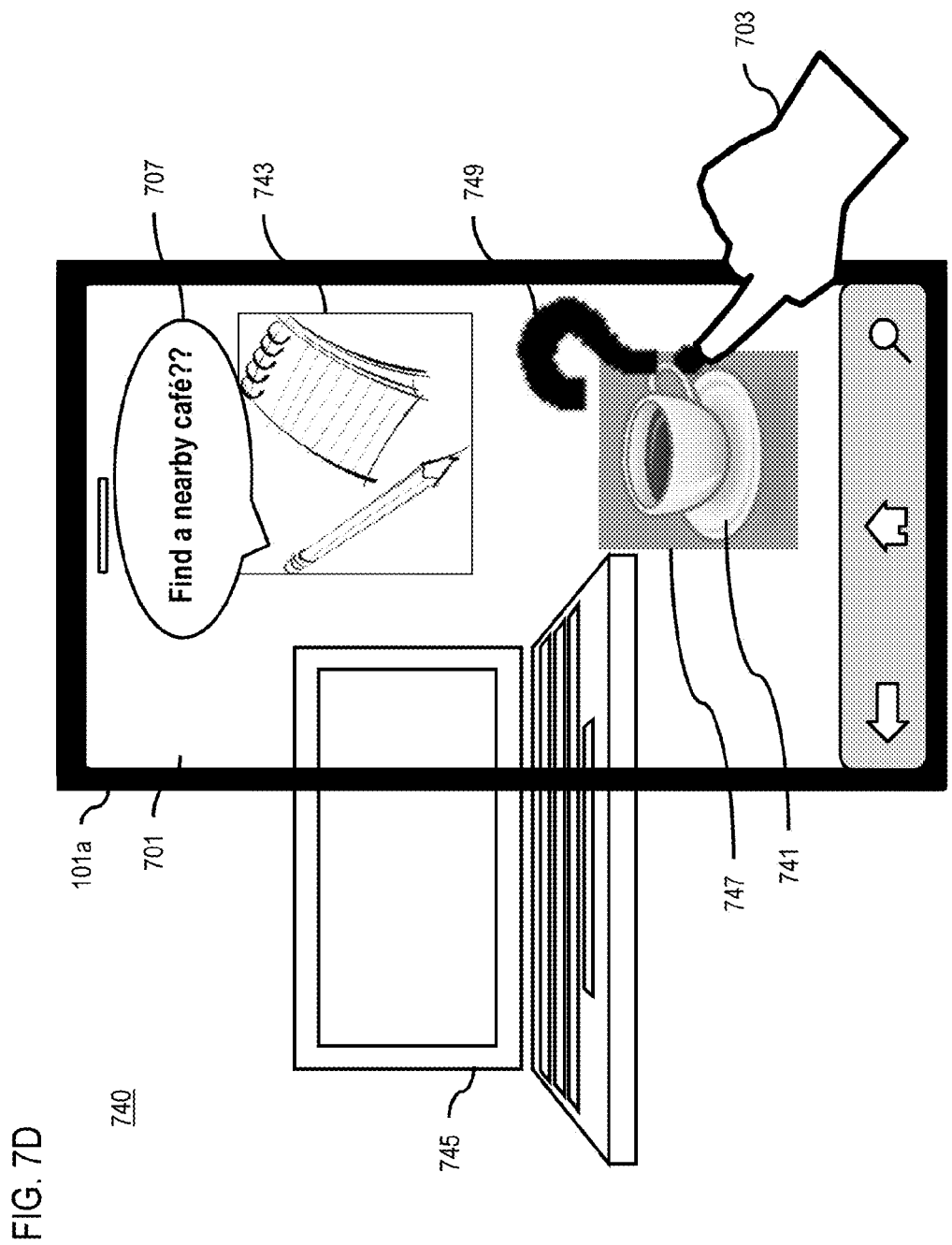

FIG. 7D includes example UI illustration 740 where a UE 101a is utilized to capture an image or display an image of an environment via the UI display 701. In one embodiment, one or more applications at the UE 101a or at a service provider may process the image data to identify one or more visual elements/objects. For example, the image data in the UI display 701 may present a plurality of visual elements 741, 743, and 745, which may be images of various objects: 741, a coffee cup/saucer; 743, pencil/pad; and 745, a computer. In one embodiment, the user 703 may utilize one or more UI interface options to select one or more visual elements/objects present in the image displayed in 701. For example, the user 703 may touch the touch-screen location where the coffee/saucer 741 are presented, wherein the touch may cause a selection indicator 747 that is associated with the coffee/saucer 741. Further, one or more sensors at the UE 101a may determine content information 749, "?" that is input by the user 703 (e.g., via a touch screen display). In one example, the user 703 may cause the selection 747 and provide an audio input "where?" into the UE 101a to cause a similar query. In one scenario, the UE 101a may use AR to overlay the user input "?" onto the image of the coffee/saucer 741. In one example, the AR query application or the applications 103 may present a UI prompt 707 to the user for confirming whether the user is seeking to "Find a nearby café ??", wherein the user may confirm or further interact with the UE 101a via one or more UI elements.

Figure 7E:
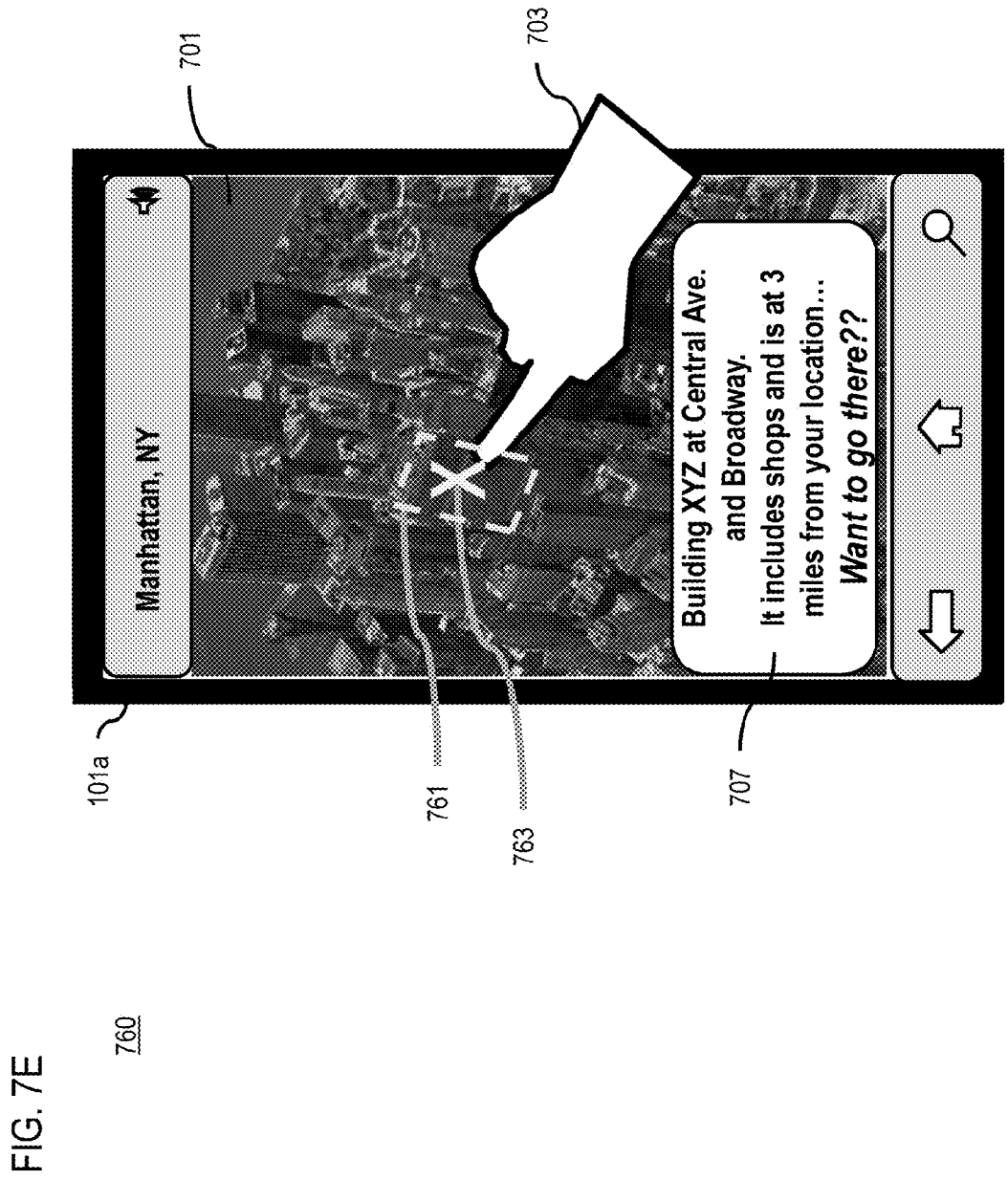

FIG. 7E includes example UI illustration 760 where a UE 101a is utilized to capture an image or display an image of an environment via the UI display 701. In one embodiment, one or more applications at the UE 101a or at a service provider may process the image data to identify one or more visual elements/objects. For example, the image data in the UI display 701 may present a virtual or an actual image a geo-location that contains a plurality of visual POIs (e.g., buildings). In one embodiment, the user 703 may utilize one or more UI interface options to select one or more visual elements/objects present in the image displayed in 701. For example, the user 703 may touch the touch-screen location where a building is presented, wherein the touch may cause a selection indicator 761 that is associated with the building. Further, one or more sensors at the UE 101a may determine content information 763, "X" that is input by the user 703 (e.g., via a touch screen display). In one example, the user 703 may cause the selection 761 and provide an audio input "where?" into the UE 101a to cause a similar query. In one scenario, the UE 101a may use AR to overlay the user input "X" onto the image of the building 761. In one example, the AR query application or the applications 103 may present a UI prompt 707 to the user for providing some information, e.g., "Building XYZ at Central Ave. and Broadway. It includes shops and is at 3 miles from your location . . . " about the selected object 761 or confirming whether the user would "Want to go there??", wherein the user may confirm or further interact with the UE 101a via one or more UI elements. In one embodiment, a user may have previously captured or stored by the user image data in 701, which may be utilized as image data in an AR query.

The processes described herein for enabling contextual queries based on visual elements and user input in augmented reality at a device may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
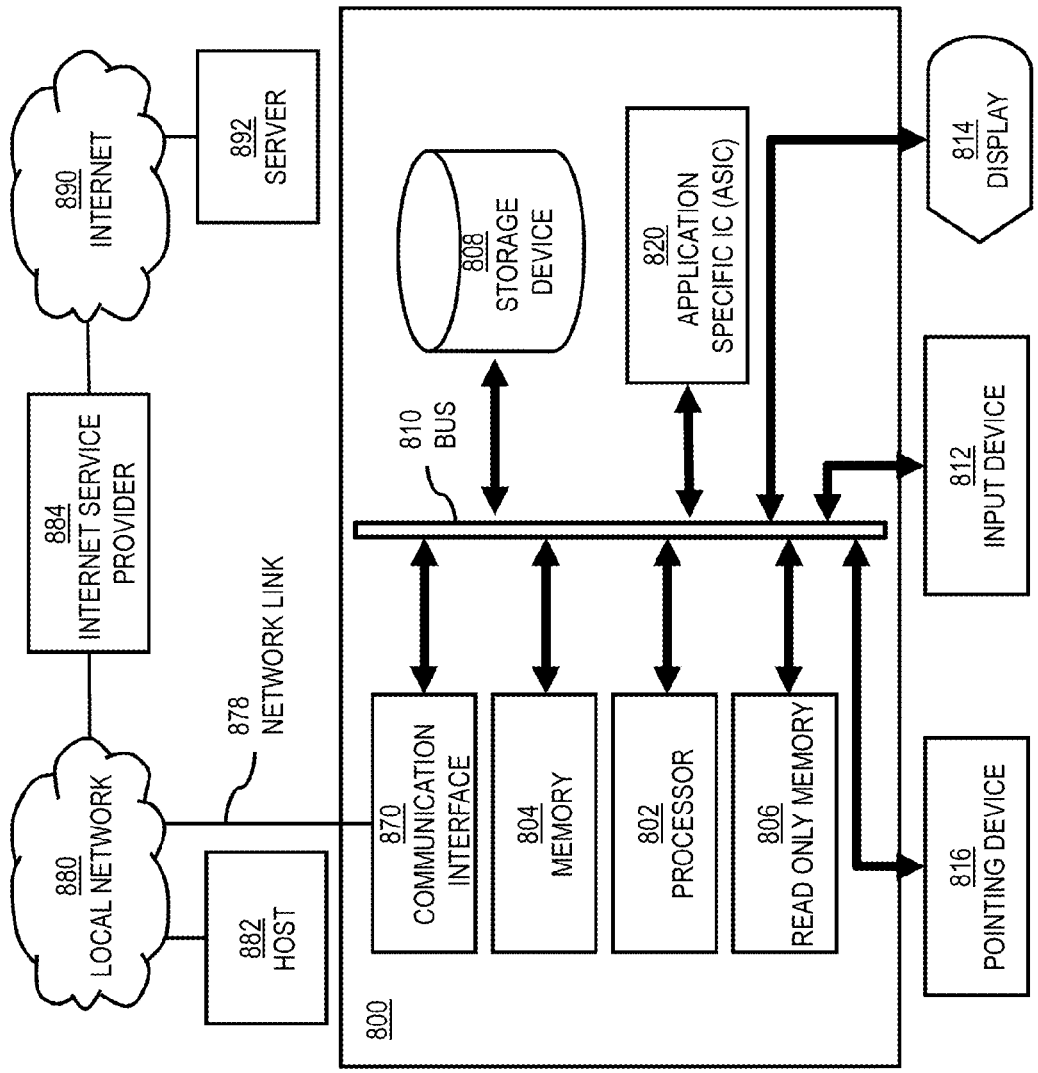
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to enable contextual queries based on visual elements and user input in augmented reality at a device as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of enabling contextual queries based on visual elements and user input in augmented reality at a device.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to enabling contextual queries based on visual elements and user input in augmented reality at a device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for enabling contextual queries based on visual elements and user input in augmented reality at a device. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for enabling contextual queries based on visual elements and user input in augmented reality at a device, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814, and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners, and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic, or electromagnetic signals, including infrared and optical signals that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 111 for enabling contextual queries based on visual elements and user input in augmented reality at a device.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880, and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed for enabling contextual queries based on visual elements and user input in augmented reality at a device as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing UI navigation information associated with the availability of functions. Chip set or chip 900, or a portion thereof, constitutes a means for performing one or more steps of enabling contextual queries based on visual elements and user input in augmented reality at a device.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to enable contextual queries based on visual elements and user input in augmented reality at a device. The memory 905 also stores the data associated with or generated by the execution of the inventive steps.

Figure 10:
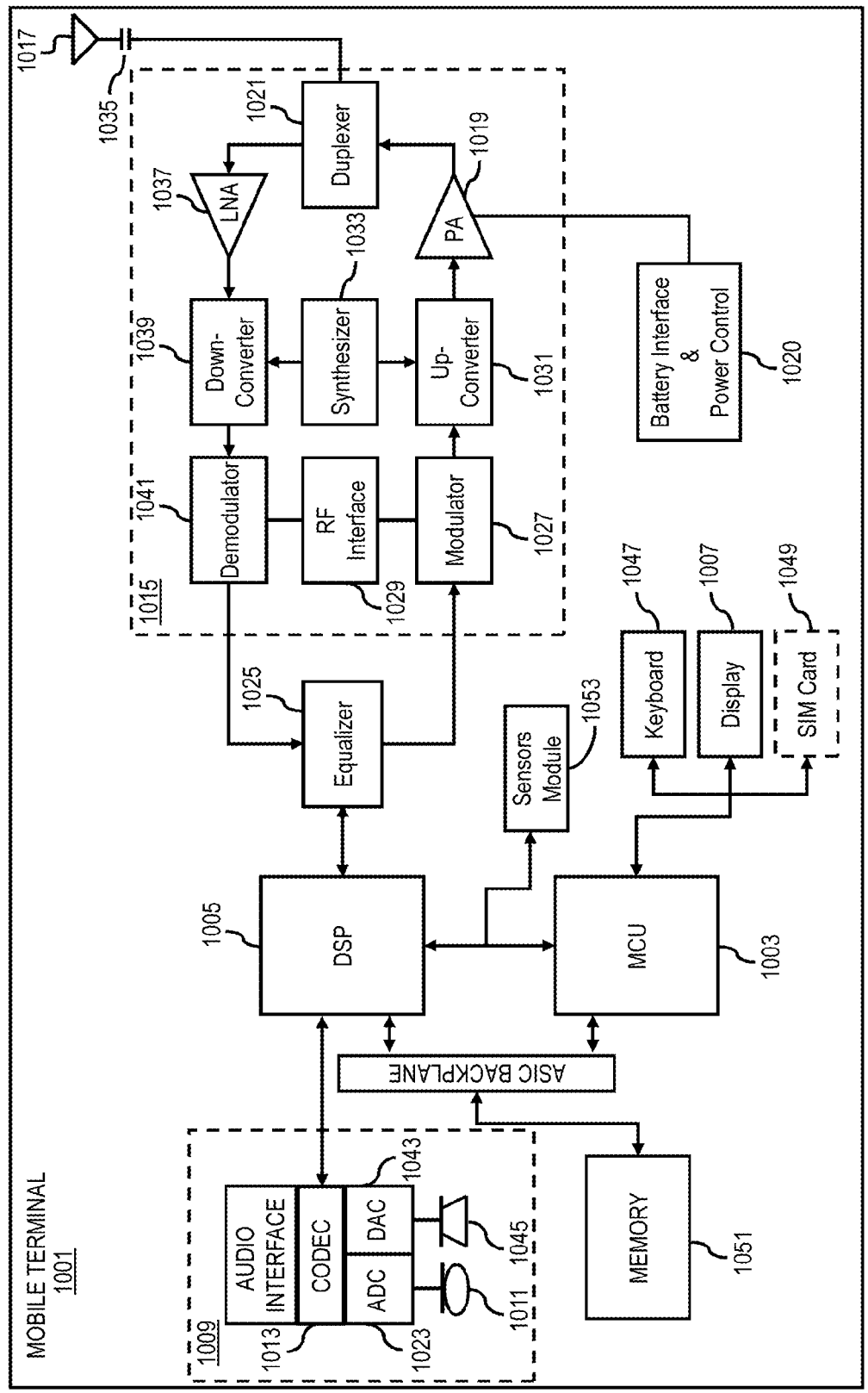
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of enabling contextual queries based on visual elements and user input in augmented reality at a device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or application processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of enabling contextual queries based on visual elements and user input in augmented reality at a device. The display 1007 includes display circuitry configured to display at least a portion of a UI of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a UI circuitry for managing user input. The MCU 1003 runs a UI software to facilitate user control of at least some functions of the mobile terminal 1001 for enabling contextual queries based on visual elements and user input in augmented reality at a device. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Additionally, sensors module 1053 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1001 (e.g., a mobile phone), a user of the mobile terminal 1001, an environment of the mobile terminal 1001 and/or the user, or a combination thereof, wherein the data may be collected, processed, stored, and/or shared with one or more components and/or modules of the mobile terminal 1001 and/or with one or more entities external to the mobile terminal 1001.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   presenting an image in a user interface of a device;
   receiving a written input specifying content information via an input device of the device, wherein the written input is received in response to the presenting of the image in the user interface;
   determining a screen location of the written input with respect to the user interface;
   processing the image to identify one or more visual elements depicted in the image, wherein the identification of the one or more visual elements is further based, at least in part, on the screen location;
   constructing at least one query, wherein the content information and the one or more visual elements are parameters of the at least one query; and
   presenting a representation of the at least one query or results of the at least one query in the user interface.

2. A method of claim 1, wherein the user interface comprises an augmented reality user interface.

3. A method of claim 1, wherein the identification of the one or more visual elements is based, at least in part, on an overlapping of the screen location with another screen location associated with the one or more visual elements.

4. A method of claim 1, further comprising:
   determining contextual information associated with the device, a user of the device, the content information, the image, the one or more visual elements, or a combination thereof,
   wherein the construction of the at least one query is further based, at least in part, on the contextual information, and
   wherein the contextual information includes, at least in part, location information.

5. A method of claim 4, wherein the written input is determined from a user tactile input, a user audio input, a user gaze information, a user activity, one or more applications at the device, or a combination thereof.

6. A method of claim 4, further comprising:
   determining the image via one or more sensors at the device, one or more applications at the device, from a storage associated with the device, or a combination thereof.

7. A method of claim 1, further comprising:
   determining one or more services, one or more points of interest, or a combination thereof associated with the one or more visual elements, the image, the content information, or a combination thereof,
   wherein the construction of the query is further based, at least in part, on the one or more services, the one or more points of interest, or a combination thereof.

8. A method of claim 1, further comprising:
presenting the representation of the at least one query or the results of the at least one query as at least one overlay element on the one or more visual elements, one or more other visual elements present in the at least one user interface, or a combination thereof.

9. A method of claim 1, further comprising:
initiating a request for one or more services based, at least in part, on the content information, the one or more visual elements, or a combination thereof.

10. An apparatus comprising:
at least one processor; and
at least one memory including computer program code for one or more programs, the at least one memory and the computer program code configured to, with the at least one processor, cause the apparatus to perform at least the following, present an image in a user interface of a device;
receive a written input specifying content information via an input device of the device, wherein the written input is received in response to the presenting of the image in the user interface;
determine a screen location of the written input with respect to the user interface;
process the image to identify one or more visual elements depicted in the image, wherein the identification of the one or more visual elements is further based, at least in part, on the screen location;
construct at least one query, wherein the content information and the one or more visual elements are parameters of the at least one query; and
present a representation of the at least one query or results of the at least one query in the user interface.

11. An apparatus of claim 10, wherein the identification of the one or more visual elements is based, at least in part, on an overlapping of the screen location with another screen location associated with the one or more visual elements.

12. An apparatus of claim 10, wherein the apparatus is further caused to:
determine contextual information associated with the device, a user of the device, the content information, the image, the one or more visual elements, or a combination thereof,
wherein the construction of the at least one query is further based, at least in part, on the contextual information, and
wherein the contextual information includes, at least in part, location information.

13. An apparatus of claim 10, wherein the apparatus is further caused to:
determine one or more services, one or more points of interest, or a combination thereof associated with the one or more visual elements, the image, the content information, or a combination thereof,
wherein the construction of the query is further based, at least in part, on the one or more services, the one or more points of interest, or a combination thereof.

14. An apparatus of claim 10, wherein the apparatus is further caused to:
present the representation of the at least one query or the results of the at least one query as at least one overlay element on the one or more visual elements, one or more other visual elements present in the at least one user interface, or a combination thereof.

15. An apparatus of claim 10, wherein the apparatus is further caused to:
initiate a request for one or more services based, at least in part, on the content information, the one or more visual elements, or a combination thereof.

16. A computer-readable storage medium carrying one or more sequences of one or more instructions which, when executed by one or more processors, cause an apparatus to at least perform the following steps:
present an image in a user interface of a device;
receive a written input specifying content information via an input device of the device, wherein the written input is received in response to the presenting of the image in the user interface;
determine a screen location of the written input with respect to the user interface;
process the image to identify one or more visual elements depicted in the image, wherein the identification of the one or more visual elements is further based, at least in part, on the screen location;
construct at least one query, wherein the content information and the one or more visual elements are parameters of the at least one query; and
present a representation of the at least one query or results of the at least one query in the user interface.

17. A computer-readable storage medium of claim 16, wherein the apparatus is further caused to:
determine contextual information associated with the device, a user of the device, the content information, the image, the one or more visual elements, or a combination thereof,
wherein the construction of the at least one query is further based, at least in part, on the contextual information, and
wherein the contextual information includes, at least in part, location information.

18. A computer-readable storage medium of claim 16, wherein the apparatus is further caused to:
determine one or more services, one or more points of interest, or a combination thereof associated with the one or more visual elements, the image, the content information, or a combination thereof,
wherein the construction of the query is further based, at least in part, on the one or more services, the one or more points of interest, or a combination thereof.

19. A computer-readable storage medium of claim 16, wherein the apparatus is further caused to:
present the representation of the at least one query or the results of the at least one query as at least one overlay element on the one or more visual elements, one or more other visual elements present in the at least one user interface, or a combination thereof.

20. A computer-readable storage medium of claim 16, wherein the apparatus is further caused to:
initiate a request for one or more services based, at least in part, on the content information, the one or more visual elements, or a combination thereof.

* * * * *